UNITED STATES PATENT OFFICE.

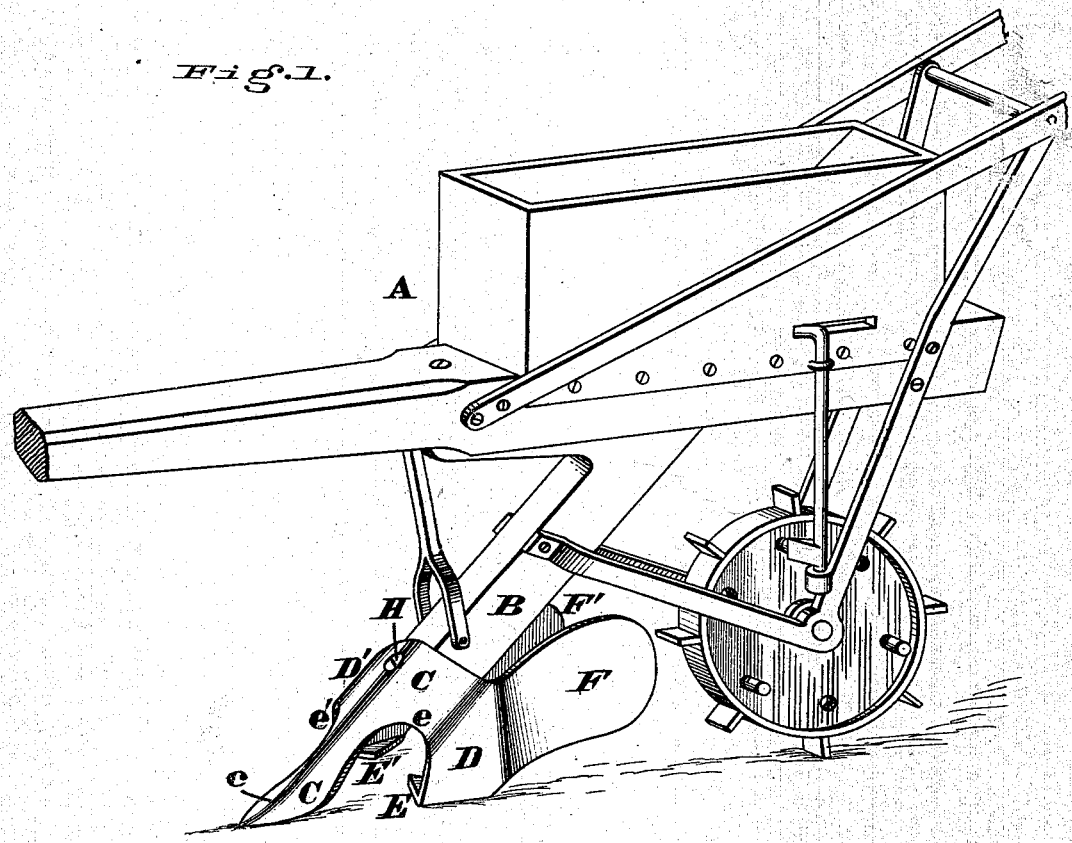
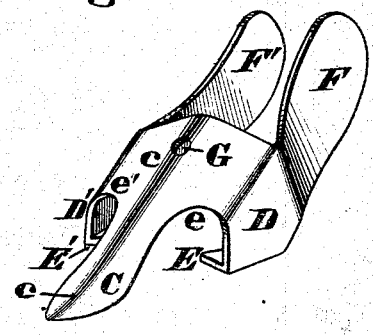
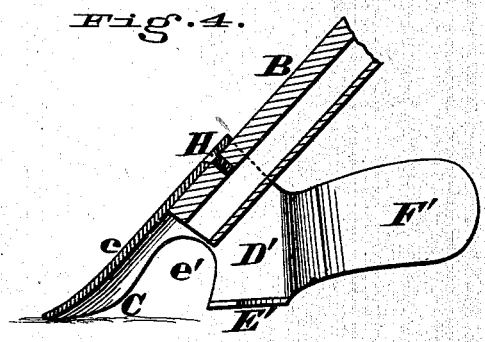
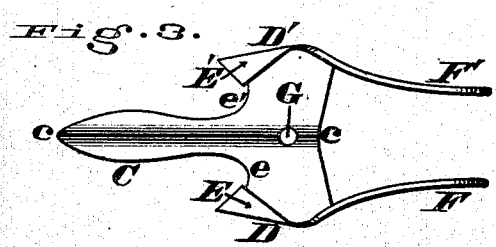

ANDREAS RÖHMER, OF NEWPORT, KENTUCKY.

IMPROVEMENT IN CORN-PLANTERS.

Specification forming part of Letters Patent No. 139,617, dated June 3, 1873; application filed January 27, 1873.

*To all whom it may concern:*

Be it known that I, ANDREAS RÖHMER, of Newport, Campbell county, Kentucky, have invented an Improved Share for Corn-Planters, of which the following is a specification:

This is an improved form of share or shovel for corn-planters, grain-drills, and similar implements, having for its object the effectual covering of the planted seed by the finer and more friable earth, to the exclusion of clods, rocks, and other hard and heavy bodies.

Figure 1 is a perspective view of a planter embodying my invention. Fig. 2 shows my improved share detached. Fig. 3 is an underside view of the same. Fig. 4 is a vertical section of my improved share in position on the sheath.

A may represent a suitable planter; B, its hollow or tubular sheath. My share or shovel consists of the following parts or members, to wit: A fluke or share proper, C, of lance-shape, declining from a central ridge, c, on its upper surface, and spreading at its rear portion, whence it bends vertically downward at D D', and horizontally inward at E E'. This form leaves openings e e', through which the lighter and more friable portions of the earth, elevated by the fluke, can pass underneath the share and upon the planted seed. At the same time the rocks, clods, and similar hard and bulky objects are fended to one or other side by the solid portions of the share. This combined clod-fending and mold-sifting action is further facilitated by the blades or wings F F', which project rearward and curve inward from the portions D D', and whose lower edges, being somewhat elevated, as shown, operate to sweep into the furrow and over the planted seed, the friable earth which has passed underneath the share through the openings e e', as before stated. The share above described is preferably composed of sheet steel; but may be made of cast steel, or cast, wrought, or malleable iron. The share has an aperture, G, in it, through which aperture a bolt, H, is passed for the purpose of attaching said share to the hollow sheath B. Any approved form of seed-slide and actuating mechanism may be employed in connection with the above-described share.

The mechanism for operating the seed-slide may be constructed and arranged in any suitable manner, and is not claimed as new.

I claim as new and of my invention—

The share C c D D' E E' e e' F F', formed as and for the purpose set forth.

In testimony of which invention I hereunto set my hand.

ANDREAS RÖHMER.

Attest:
GEO. H. KNIGHT,
JAMES H. LAYMAN.